(12) United States Patent
Takeuchi et al.

(10) Patent No.: US 11,990,065 B2
(45) Date of Patent: May 21, 2024

(54) DISPLAY CONTROL METHOD AND NON-TRANSITORY COMPUTER-READABLE STORAGE MEDIUM STORING PROGRAM FOR HAVING A VIRTUAL DISPLAY RELATING TO AN ACTUAL DISPLAY

(71) Applicant: SEIKO EPSON CORPORATION, Tokyo (JP)

(72) Inventors: Kota Takeuchi, Matsumoto (JP); Hiroyuki Ichieda, Matsumoto (JP); Kenichiro Tomita, Matsumoto (JP); Kentaro Ide, Shiojiri (JP); Tetsuya Asano, London (GB); Toshiki Fujimori, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 146 days.

(21) Appl. No.: 17/686,552

(22) Filed: Mar. 4, 2022

(65) Prior Publication Data

US 2022/0284838 A1   Sep. 8, 2022

(30) Foreign Application Priority Data

Mar. 5, 2021   (JP) ................. 2021-035085

(51) Int. Cl.
   *G09G 3/00*   (2006.01)
(52) U.S. Cl.
   CPC ....... *G09G 3/002* (2013.01); *G09G 2340/045* (2013.01); *G09G 2340/12* (2013.01); *G09G 2354/00* (2013.01)

(58) Field of Classification Search
   None
   See application file for complete search history.

(56) References Cited

U.S. PATENT DOCUMENTS

| | | | |
|---|---|---|---|
| 8,937,590 B2 * | 1/2015 | Hachiya | G06F 3/04883 345/157 |
| 2004/0221230 A1 * | 11/2004 | Kakemura | H04N 9/3188 709/201 |
| 2009/0096939 A1 | 4/2009 | Nomizo | |
| 2010/0302130 A1 | 12/2010 | Kikuchi et al. | |
| 2012/0017147 A1 * | 1/2012 | Mark | G06F 3/04883 715/848 |
| 2012/0162444 A1 * | 6/2012 | Suda | G06F 3/03545 348/207.1 |

(Continued)

FOREIGN PATENT DOCUMENTS

| | | |
|---|---|---|
| JP | 2007-086616 A | 4/2007 |
| JP | 2010-164981 A | 7/2010 |

(Continued)

*Primary Examiner* — Patrick F Valdez
(74) *Attorney, Agent, or Firm* — Oliff PLC

(57) ABSTRACT

A display control method includes displaying a first small image generated by shrinking a first image generated by an application program, on an actual display provided in an output device, receiving an operation on the first small image, drawing, on a virtual display, a second image generated by the application program executing processing corresponding to the operation on the first small image, displaying the second image drawn on the virtual display, using a display device, and displaying a second small image generated by shrinking the second image, on the actual display.

3 Claims, 13 Drawing Sheets

(56) References Cited

U.S. PATENT DOCUMENTS

| | | | | |
|---|---|---|---|---|
| 2013/0069870 A1* | 3/2013 | Ichieda | ............... | G06F 3/03545 |
| | | | | 345/157 |
| 2019/0171406 A1* | 6/2019 | Monden | ................ | G06F 3/1454 |
| 2021/0096733 A1* | 4/2021 | Greenebaum | ......... | G06F 3/1423 |

FOREIGN PATENT DOCUMENTS

| | | |
|---|---|---|
| JP | 2010-278824 A | 12/2010 |
| JP | 2016-085435 A | 5/2016 |

\* cited by examiner

DISPLAY CONTROL METHOD AND NON-TRANSITORY COMPUTER-READABLE STORAGE MEDIUM STORING PROGRAM FOR HAVING A VIRTUAL DISPLAY RELATING TO AN ACTUAL DISPLAY

The present application is based on, and claims priority from JP Application Serial Number 2021-035085, filed Mar. 5, 2021, the disclosure of which is hereby incorporated by reference herein in its entirety.

BACKGROUND

1. Technical Field

The present disclosure relates to a display control method and a non-transitory computer-readable storage medium storing a program.

2. Related Art

According to the related art, a system that causes a display device to display an image outputted from an output device is known.

For example, JP-A-2010-164981 discloses an image transfer device coupled to a plurality of image projection devices. The image transfer device causes a display to display a layout display image of display image data to be transferred to the plurality of image projection devices. When an operation is performed on the layout display image, the image transfer device causes the display image data corresponding to the layout display image where the operation is performed, to reflect the performed operation.

However, the image transfer device disclosed in JP-A-2010-164981 can change the layout of the display image by operating the layout display image but does not support other operations. For example, the image transfer device does not support an operation of causing an application program to execute processing.

SUMMARY

An aspect of the present disclosure is directed to a display control method including: displaying a first small image formed by reducing a first image generated by an application program, on an actual display provided in an output device; accepting an operation on the first small image; drawing, on a virtual display, a second image generated by the application program executing processing corresponding to the operation on the first small image; displaying the second image drawn on the virtual display, using a display device; and displaying a second small image formed by reducing the second image, on the actual display.

Another aspect of the present disclosure is directed to a non-transitory computer-readable medium storing a program. The program causes a computer to execute: displaying a first small image formed by reducing a first image generated by an application program, on an actual display provided in an output device; accepting an operation on the first small image; drawing, on a virtual display, a second image generated by the application program executing processing corresponding to the operation on the first small image; displaying the second image drawn on the virtual display, using a display device; and displaying a second small image formed by reducing the second image, on the actual display.

DESCRIPTION OF EXEMPLARY EMBODIMENTS

A. First Embodiment

A-1. System Configuration

Figure 1:
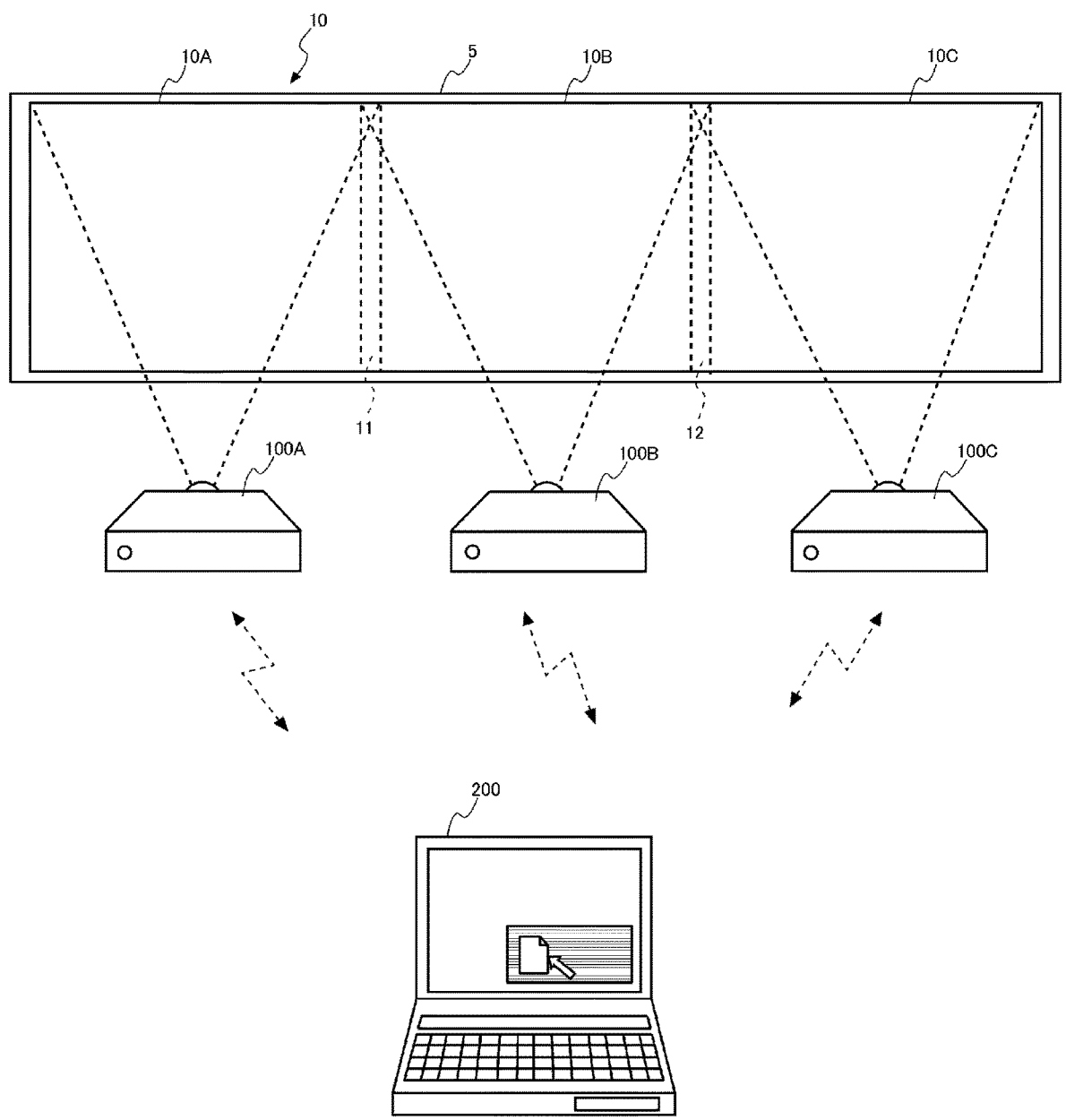
FIG. 1 is a system configuration view of a display system.

FIG. 1 is a system configuration of a display system 1 according to a first embodiment.

The display system 1 has a plurality of projectors 100, which are display devices, and an information processing device 200, which is an output device outputting an image to the plurality of projectors 100.

In this embodiment, a case where the display system 1 has three projectors 100, that is, projectors 100A, 100B, and 100C, is described. However, the number of projectors 100 provided in the display system 1 is not limited to three and may be one. In the description below, the projectors 100A, 100B, and 100C may be generically referred to as the "projector 100".

In this embodiment, an example where the information processing device 200 and each of the projectors 100A, 100B, and 100C are wirelessly coupled together is described. However, the coupling form is not limited to this example. For example, the projectors 100A, 100B, and 100C may be daisy-chained, and the projector 100A, which is the first projector 100 of the daisy chain, and the information processing device 200 may be coupled together. Also, the coupling between the information processing device 200 and the projectors 100A, 100B, and 100C may be a wired coupling via a cable.

As the information processing device 200, for example, a laptop PC (personal computer), a desktop PC, a tablet terminal, a smartphone, a PDA (personal digital assistant) or the like is used.

FIG. 1 shows an example where the projectors 100A, 100B, and 100C are arranged in a horizontal line along a projection surface 5 and where the individual projectors 100 display images horizontally next to each other on the projection surface 5.

The method for installing the projectors 100A, 100B, and 100C is not limited to on-floor installation, in which the projectors 100 are installed on a floor surface. Ceiling-suspension installation, in which the projectors 100 are suspended from a ceiling, or wall-hanging installation, in which the projectors 100 are hung on a wall surface, may be employed as well.

As for the arrangement of the projectors 100, the projectors 100A, 100B, and 100C may be installed, arranged in a vertical line. Also, the projectors 100 may be arranged in a matrix of N rows and M columns. N and M are any natural numbers.

An area in the projection surface 5 where image light is projected by the projectors 100A, 100B, and 100C is referred to as a projection area 10. The projector 100A projects image light in a projection area 10A on the left as one faces the projection surface 5. The projector 100B projects image light in a projection area 10B in the center as one faces the projection surface 5. The projector 100C projects image light in a projection area 10C on the right as one faces the projection surface 5.

The projectors 100A, 100B, and 100C perform tiling projection. The tiling projection is a projection method of projecting image light from a plurality of projectors 100, then coupling together the images displayed on the projection surface 5 by the plurality of projectors 100, and thus displaying one large-screen image.

In the tiling projection, the projectors 100 next to each other project image light in such a way that the edges of the displayed images overlap each other. This is for the purpose of making the boundaries of the displayed images less visible. For example, the edges of the image displayed by the projector 100A and the image displayed by the projector 100B located to the right of the projector 100A overlap each other and form an overlap area 11. Similarly, the edges of the image displayed by the projector 100B and the image displayed by the projector 100C located to the right of the projector 100B overlap each other and form an overlap area 12.

A-2. Configuration of Projector 100

Figure 2:
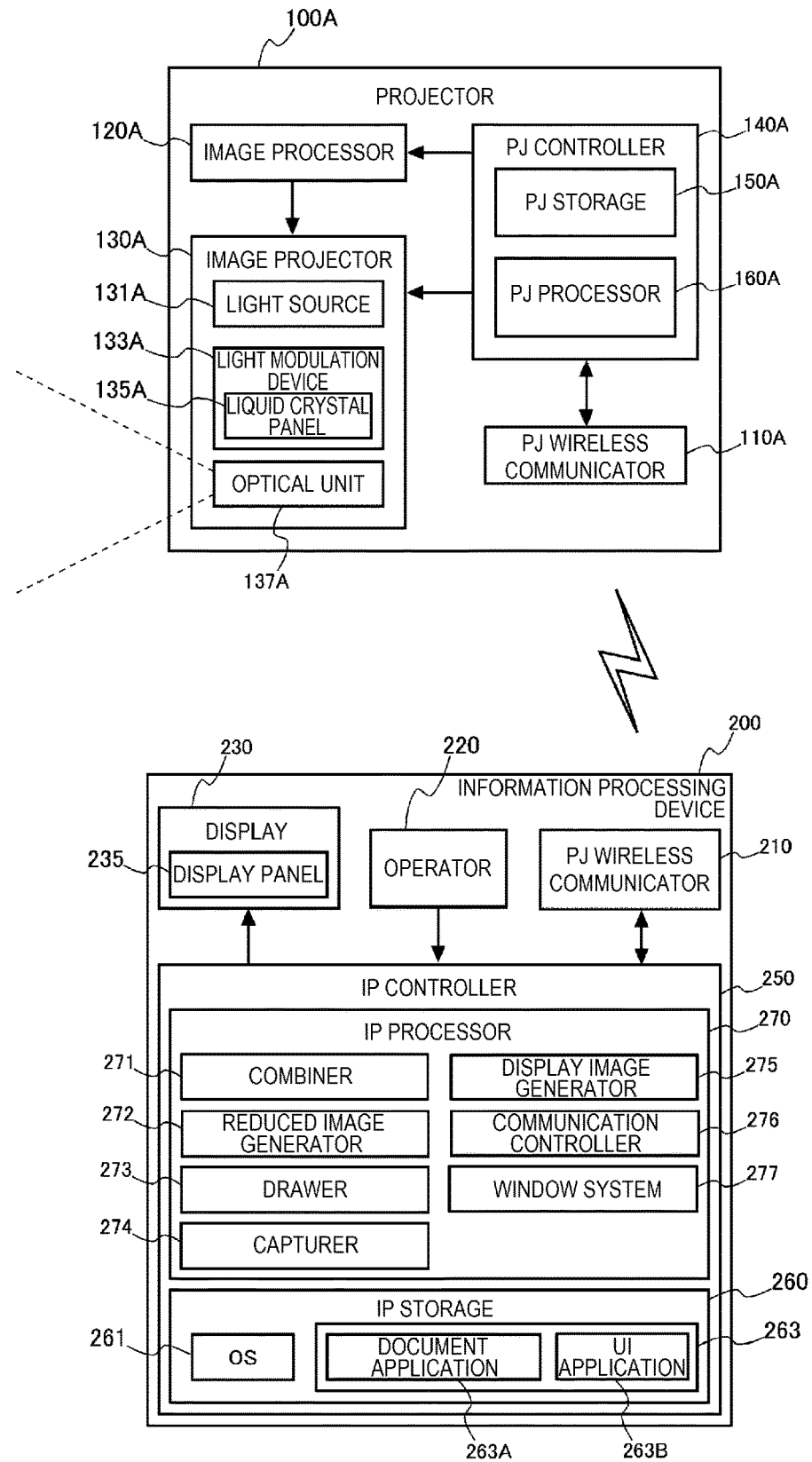
FIG. 2 shows an example of the configuration of a projector and an information processing device.

FIG. 2 shows an example of the configuration of the projector 100A and the information processing device 200.

The projectors 100A, 100B, and 100C have substantially the same configurations. Therefore, the configuration of the projector 100A is described as a representative example and the description of the other projectors 100B and 100C is omitted. In the description below, the letter "A" is added to the configuration of the projector 100A, the letter "B" is added to the configuration of the projector 100B, and the letter "C" is added to the configuration of the projector 100C in order to distinguish the configurations of the individual projectors 100 from each other. However, the letters "A", "B" and the like relating to configurations other than those of the projectors 100 do not represent the correspondence with the projectors 100.

The projector 100A has a PJ wireless communicator 110A, an image processor 120A, an image projector 130A, and a PJ controller 140A.

The PJ wireless communicator 110A is an interface wirelessly communicating with an external device including the information processing device 200. The PJ wireless communicator 110A is formed of, for example, a network interface card such as a wireless LAN (local area network) card. The PJ wireless communicator 110A wirelessly communicates with an external device and transmits and receives various kinds of information.

To the image processor 120A, image data is inputted from the PJ controller 140A. The PJ controller 140A outputs image data received by the PJ wireless communicator 110A to the image processor 120A. At this point, the PJ controller 140A outputs a parameter used for image processing to be executed by the image processor 120A, to the image processor 120A.

The image processor 120A loads the inputted image data into a frame memory, not illustrated, and performs image processing on the loaded image data. The image processor 120A performs, for example, processing such as resolution conversion processing of changing the resolution of the inputted image data, shape correction processing of correcting a distortion of the image displayed in the projection area 10A, and processing of correcting the color tone and luminance of the image. The image processor 120A executes the processing designated by the PJ controller 140A and performs the processing using the parameter inputted from the PJ controller 140A according to need. The image processor 120A can also execute a combination of a plurality of types of processing, of the above processing. The image processor 120A reads out the processed image data from the frame memory and outputs the read-out image data as image information to the image projector 130A.

The image processor 120A and the frame memory are formed of an integrated circuit, for example. The integrated circuit includes an LSI (large scale integration), an ASIC (application-specific integrated circuit), a PLD (programmable logic device), an FPGA (field-programmable gate array), an SoC (system-on-a-chip) or the like. A part of the configuration of the integrated circuit may include an analog circuit. Also, the PJ controller 140A and the integrated circuit may be combined together.

The image projector 130A has a light source 131A, a light modulation device 133A, and an optical unit 137A.

As the light source 131A, a lamp light source such as a halogen lamp, a xenon lamp or an ultra-high-pressure mercury lamp is used. Also, a solid-state light source such as an LED or a laser light source may be used as the light source 131A.

The light modulation device 133A has a liquid crystal panel 135A as a modulation element modulating the light from the light source 131A. The liquid crystal panel 135A is provided for each of the colors of red, green, and blue. The liquid crystal panel 135A is formed of, for example, a transmission-type liquid crystal panel having a pair of transparent substrates with a liquid crystal enclosed between the substrates. In the liquid crystal panel 135A, a pixel area formed of a plurality of pixels arranged in a matrix is formed and a drive voltage can be applied to the liquid crystal at each pixel.

To the light modulation device 133A, image information is inputted from the image processor 120A. The light modulation device 133A applies a drive voltage corresponding to the inputted image information to each pixel in the pixel area of the liquid crystal panel 135A and thus sets each pixel to a light transmittance corresponding to the image information. The light emitted from the light source 131A is separated into color lights of red, green, and blue by a color separation system, not illustrated, and each color light enters the liquid crystal panel 135A of the light modulation device 133A. Each color light is transmitted through the pixel area of the liquid crystal panel 135A and thus modulated for each pixel. Thus, image light corresponding to the image information is formed for each color light. The image lights of the individual colors, thus formed, are combined together for each pixel by a light combining system, not illustrated, and thus form image light representing a color image.

The optical unit 137A has an optical element such as a lens and a mirror and projects the image light modulated by the light modulation device 133A to the projection surface 5. Thus, an image based on the image light is formed on the projection surface 5.

The PJ controller 140A is a computer device having a PJ storage 150A and a PJ processor 160A. The PJ controller 140A causes the PJ processor 160A to execute a control program stored in the PJ storage 150A and thus comprehensively controls operations of the projector 100A.

The PJ storage 150A has a memory such as a RAM (random-access memory) and a ROM (read-only memory). The RAM is used to temporarily store various data or the like. The ROM stores a control program for controlling operations of the projector 100A and various kinds of setting information or the like.

The PJ processor 160A is an arithmetic processing device formed of a CPU (central processing unit) or an MPU (micro processing unit). The PJ processor 160A executes the control program and thus controls each part of the projector 100A. The PJ processor 160A may be formed of a single processor or a plurality of processors.

When the PJ wireless communicator 110A receives image data from the information processing device 200, the PJ processor 160A causes the image processor 120A to process the received image data. The PJ processor 160A causes the image projector 130A to generate image light based on the image data processed by the image processor 120A. The generated image light is projected by the optical unit 137A. Thus, an image is displayed on the projection surface 5.

A-3. Configuration of Information Processing Device 200

The configuration of the information processing device 200 will now be described.

The information processing device 200 has an IP wireless communicator 210, an operator 220, a display 230, and an IP controller 250.

The IP wireless communicator 210 is an interface wirelessly communicating with an external device including the projector 100. The IP wireless communicator 210 is formed of, for example, a network interface card such as a wireless LAN card. The IP wireless communicator 210 wirelessly communicates with an external device and transmits and receives various kinds of information.

The operator 220 is formed of, for example, an input device such as a mouse or a keyboard and accepts an operation by a user. The operator 220 outputs operation information corresponding to the accepted operation to the IP controller 250. When the input device is a mouse, the operation information includes information representing an operation such as a right click, a left click or a drag-and-drop operation on the mouse, and information representing the amount of movement of the mouse. When the input device is a keyboard, the operation information includes information about a key operated by the user.

The operator 220 may also be formed of a touch panel detecting a touch operation on a display panel 235 provided in the display 230. In this case, the operator 220 outputs coordinate information of the display panel 235 representing the position of the detected touch operation, to the IP controller 250.

The display 230 includes the display panel 235 such as a liquid crystal panel or an organic EL (electroluminescence) panel, and a drive circuit driving the display panel 235. The display panel 235 is equivalent to an actual display provided in the information processing device 200. The display 230 generates a display signal that can be displayed on the display panel 235, based on a display image generated by the IP controller 250, and outputs the generated display signal to the display panel 235. On the display panel 235, an image corresponding to the inputted display signal is displayed.

The IP controller 250 is a computer device having an IP storage 260 and an IP processor 270 and comprehensively controls each part of the information processing device 200.

The IP storage 260 has a memory such as a RAM and a ROM. The RAM is used to temporarily store various data or the like. The ROM stores a control program for controlling operations of the information processing device 200, and various kinds of setting information or the like. The control program includes an OS (operating system) 261 and an application program 263. Hereinafter, the application program. 263 is simply referred to as the application 263. The ROM in this embodiment stores a document application 263A and a UI application 263B, as the application 263. The document application 263A is an application for preparing a document file.

The UI application 263B functions as a user interface transmitting an application image 301 generated by another application 263 to the projector 100 and has a function of drawing an image including the application image 301 on a virtual display 265. The UI application 263B also has a function of capturing the image drawn on the virtual display 265 to generate a capture image and transmitting the generated capture image to the projector 100.

The IP processor 270 is an arithmetic processing device formed of a CPU or an MPU. The IP processor 270 executes the control program and thus controls each part of the information processing device 200. The IP processor 270 may be formed of a single processor or a plurality of processors.

The IP controller 250 has a combiner 271, a reduced image generator 272, a drawer 273, a capturer 274, a display image generator 275, a communication controller 276, and a window system 277, as functional blocks. These functional blocks are functions represented in the form of blocks implemented by the IP processor 270 executing the control program. The combiner 271, the reduced image generator 272, the drawer 273, the capturer 274, the display image generator 275, and the communication controller 276 are functions implemented by the IP processor 270 executing the UI application 263B. The UI application 263B is a program for performing control corresponding to a display control method. The window system 277 is a function implemented by the IP processor 270 executing the OS 261.

A-4. Operation of IP Controller 250

Figure 3:
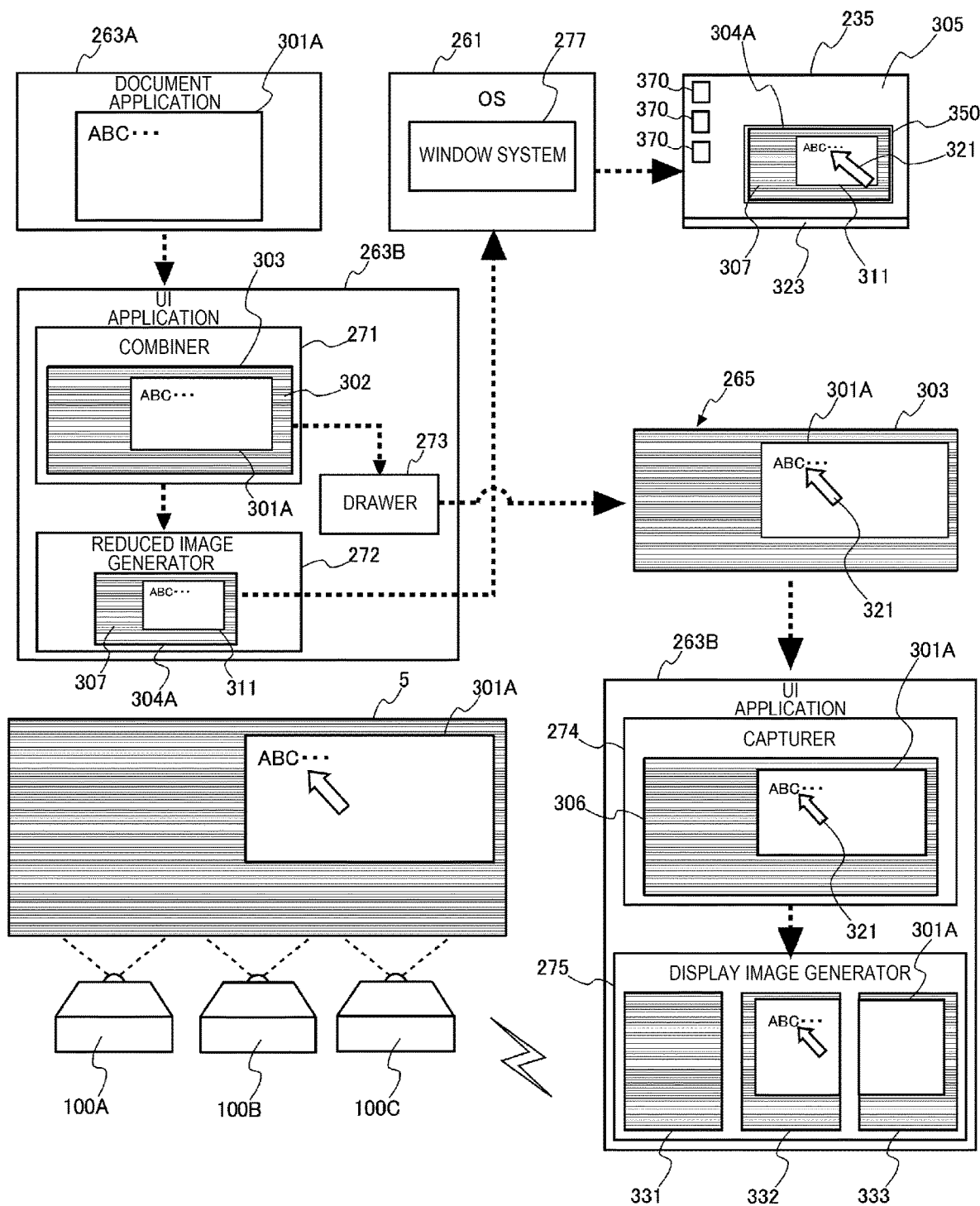
FIG. 3 shows a flow of processing by an IP controller in a first embodiment.

FIG. 3 shows a flow of processing by the IP controller 250.

The operation of each functional block provided in the IP controller 250 will now be described with reference to FIG. 3. The description starts with the state where the document application 263A and the UI application 263B have already been started by a user's operation.

When started, the document application 263A generates an application image 301A. The application image 301A generated when the document application 263A is started is an initial screen. However, the application image 301A is not limited to the initial screen. The application image 301A is equivalent to a first image.

The combiner 271 acquires the application image 301A generated by the document application 263A and a background image 302 stored in the IP storage 260. The background image 302 may be an image generated by the UI application 263B according to a setting configured by the user. The combiner 271 combines together the application image 301A and the background image 302 that are acquired, and thus generates a projection image 303. The combiner 271 outputs the generated projection image 303 to the reduced image generator 272 and the drawer 273.

The reduced image generator 272 shrinks the size of the inputted projection image 303 and thus generates a reduced image 304A. The reduced image 304A is equivalent to a first reduced image. The reduced image 304A includes a small application image 311 formed by reducing the application image 301A, and a small background image 307 formed by reducing the background image 302. The small application image 311 is equivalent to a first small image. The reduced image generator 272 outputs the generated reduced image 304A to the window system 277 of the OS 261. The window system 277 combines together the inputted reduced image 304A and an image of a mouse pointer 321, a task bar 323, and an icon 370 or the like, and thus generates a display image 305. The icon 370 is, for example, a shortcut icon of the application 263, an icon of an image file or the like. The OS 261 causes the display panel 235 to display the generated display image 305. The reduced image 304A is displayed in a window 350, as an image displayed by the UI application 263B.

The drawer 273 draws the projection image 303 on the virtual display 265. The virtual display 265 is a storage area secured in the IP storage 260 by the UI application 263B and is an area where an image is drawn by the UI application 263B.

The drawer 273 acquires coordinate information on the display panel 235 where the mouse pointer 321 is displayed and coordinate information on the display panel 235 where the window 350 is displayed, from the window system 277. Based on the acquired coordinate information, the drawer 273 determines whether an image of the mouse pointer 321 is displayed in the window 350 or not. When an image of the mouse pointer 321 is displayed in the window 350, the drawer 273 draws an image of the mouse pointer 321 at coordinates on the virtual display 265 corresponding to the coordinates of the mouse pointer 321 displayed on the display panel 235. Details of this processing will be described later with reference to FIG. 5.

The capturer 274 captures the projection image 303 drawn on the virtual display 265 and thus generates a capture image 306. The capturer 274 outputs the generated capture image 306 to the display image generator 275.

The display image generator 275 splits the inputted capture image 306 into a plurality of images, based on split data. The display image generator 275 splits the capture image 306 into a first split image 331, a second split image 332, and a third split image 333, based on the split data. The first split image 331 is an image displayed in the projection area 10A by the projector 100A. The second split image 332 is an image displayed in the projection area 10B by the projector 100B. The third split image 333 is an image displayed in the projection area 10C by the projector 100C. The display image generator 275 outputs the first split image 331, the second split image 332, and the third split image 333, thus split, to the communication controller 276.

The split data will now be described. The split data is data generated before causing the projector 100 to start projecting image light and is data for splitting the capture image 306 into images to be displayed by the projectors 100A, 100B, and 100C.

The split data is generated according to the following procedures, for example. First, a preset pattern image is projected onto the projection surface 5 by the projector 100A and an image of the entirety of the projection surface 5 where the pattern image is projected is picked up. When a camera is installed in the projector 100, this image pickup may be performed by the camera installed in the projector 100. The image pickup may also be performed by a camera externally coupled to the information processing device 200. This processing is performed similarly with respect to the projector 100B and the projector 100C. Thus, the projection area 10 on the projection surface 5 is detected and each of the projection areas 10A, 10B, and 10C where an image is displayed by the projector 100A, the projector 100B, and the projector 100C is detected. The information processing device 200 acquires the picked-up image, detects the projection area 10, the projection area 10A, the projection area 10B, and the projection area 10C, based on the acquired picked-up image, and generates split data based on the results of the detection.

The communication controller 276 controls the IP wireless communicator 210 to transmit the first split image 331 to the projector 100A, transmit the second split image 332 to the projector 100B, and transmit the third split image 333 to the projector 100C.

When receiving the first split image 331 from the information processing device 200, the projector 100A performs image processing on the received first split image 331 and projects image light based on the processed first split image 331 into the projection area 10A. The projector 100B and the projector 100C operate similarly to the projector 100A. Thus, the projection image 303 drawn on the virtual display 265 is displayed on the projection surface 5.

Figure 4:
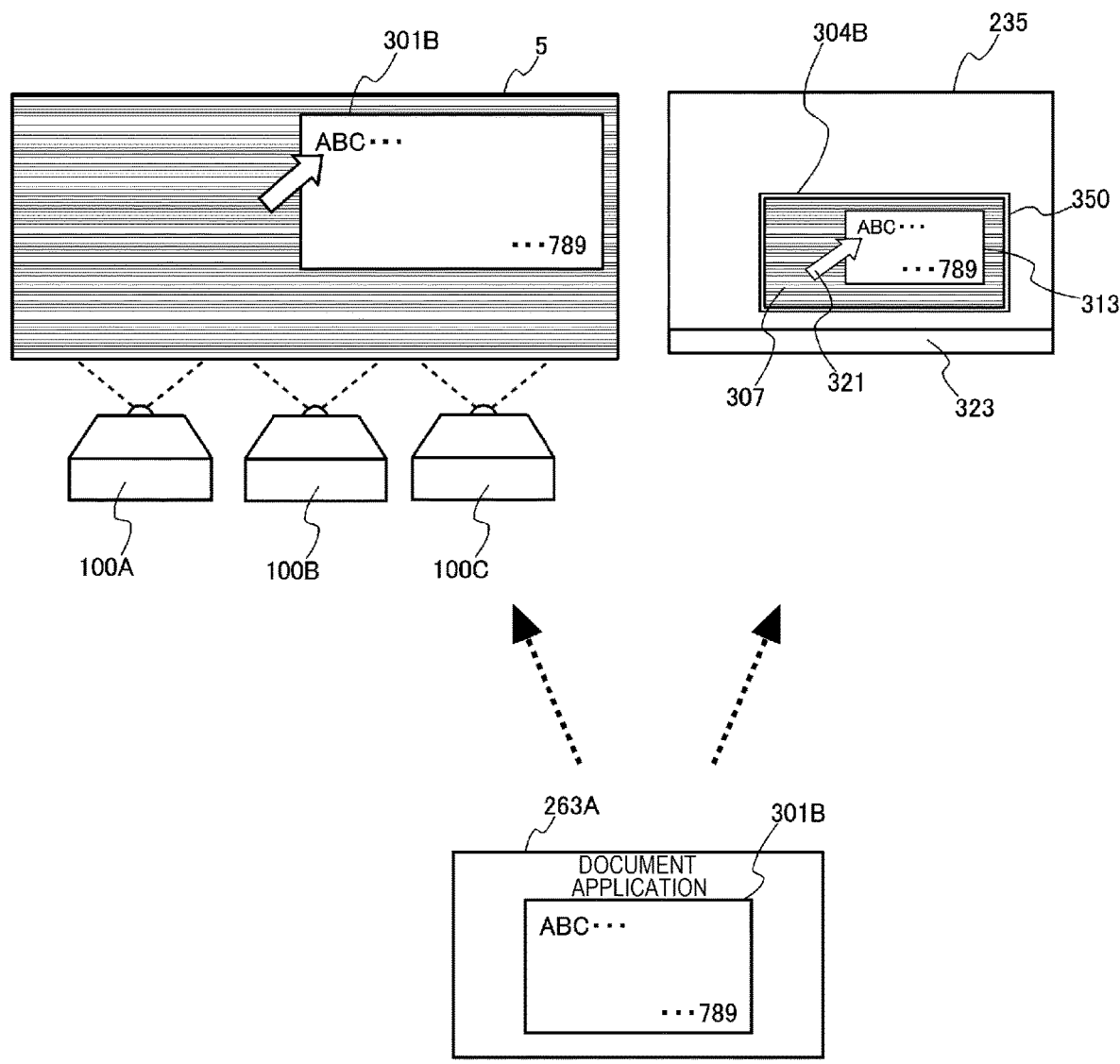
FIG. 4 shows an updated application image.

FIG. 4 shows an updated application image 301B. In this embodiment, the document application 263A accepts an operation on the small application image 311 displayed in the window 350 via the OS 261 and thus generates the application image 301B. The application image 301B is equivalent to a second image.

When accepting an operation on the small application image 311 by the user, the document application 263A executes processing corresponding to the accepted operation and updates the application image 301A. Specifically, when operation information is inputted from the operator 220, the document application 263A acquires coordinate information of the mouse pointer 321 or a cursor or the like, not illustrated, on the display panel 235, and coordinate information of the small application image 311 on the display panel 235, from the OS 261. The coordinate information acquired by the document application 263A is the information as of when the operator 220 accepts the operation. When the coordinate information of the mouse pointer 321 or the like is included in the coordinate information of the small application image 311, the document application 263A determines the accepted operation, based on the position of the mouse pointer 321 or the like on the small application image 311 and the operation represented by the operation information. The document application 263A then executes processing corresponding to the determined operation and thus updates the application image 301A. Thus, the application image 301B reflecting the result of the processing corresponding to the accepted operation is generated. The UI application 263B causes the display panel 235 to display the window 350 where an updated reduced image 304B is displayed, according to the procedures described with reference to FIG. 3.

The combiner 271 combines together the application image 301B generated by the document application 263A and the background image 302 and thus generates the projection image 303. The reduced image generator 272 reduces the size of the projection image 303 inputted from the combiner 271 and thus generates the reduced image 304B. The reduced image 304B includes the small background image 307 and a small application image 313 formed by reducing the updated application image 301B. The reduced image 304B is equivalent to a second reduced image. The small application image 313 is equivalent to a second small image. The OS 261 generates the display image 305 including the small application image 313 inputted from the reduced image generator 272 and causes the display panel 235 to display the display image 305.

The drawer 273 draws the projection image 303 including the application image 301B inputted from the combiner 271, on the virtual display 265. The capturer 274 captures the projection image 303 drawn on the virtual display 265 and thus generates the capture image 306. The UI application 263B splits the generated capture image 306 and thus generates the first split image 331, the second split image 332, and the third split image 333. The UI application 263B transmits the first split image 331, the second split image 332, and the third split image 333, thus generated, to the projectors 100A, 100B, and 100C and causes the projectors 100A, 100B, and 100C to display the capture image 306 including the updated application image 301B on the projection surface 5.

The user can cause the document application 263A to execute processing by operating the mouse pointer 321 on the small application image 311.

For example, when the coordinate information of the mouse pointer 321 represents coordinates where a close button of the small application image 311 is displayed and the operation represented by the operation information is a left click, the document application 263A ends the output of the application image 301B to the UI application 263B. Thus, the application image 301B is deleted from the projection image 303 and the display of the small application image 311 in the reduced image 304A ends.

Meanwhile, when the document application 263A is a spreadsheet program and the coordinate information of the mouse pointer 321 represents the coordinates of a cell displayed in the small application image 311 and the operation represented by the operation information is a left double-click, the application image 301A displayed on the projection surface 5, and a cursor in the cell represented by the coordinate information of the small application image 311 displayed on the display panel 235, are displayed.

Also, for example, when the document application 263A is a document preparation application, the document application 263A accepts an operation such as opening or closing a file, adjusting the layout, or inserting an image or the like, as an operation of the mouse provided in the operator 220.

A-5. Display of Mouse Pointer 321

The display of the mouse pointer 321 will now be described.

In the first embodiment, the image displayed on the projection surface 5 by the projector 100 is the image drawn on the virtual display 265 by the UI application 263B and the OS 261 does not play any part in the drawing of the image on the virtual display 265. Therefore, in the image drawn on the virtual display 265, the mouse pointer 321 and the task bar 323 generated by the OS 261 are not displayed. Meanwhile, in the display image 305 displayed on the display panel 235, images of the mouse pointer 321 and the task bar 323 are displayed by the OS 261. Hereinafter, a method for drawing an image of the mouse pointer 321 on the virtual display 265 in this embodiment will be described with reference to FIG. 5.

When the display position of the mouse pointer 321 is moved into the window 350 by a user's operation, the UI application 263B draws an image of the mouse pointer 321 on the virtual display 265. Thus, an image of the mouse pointer 321 is also displayed in the image displayed on the projection surface 5, reducing the user's feeling that something is wrong.

Figure 5:
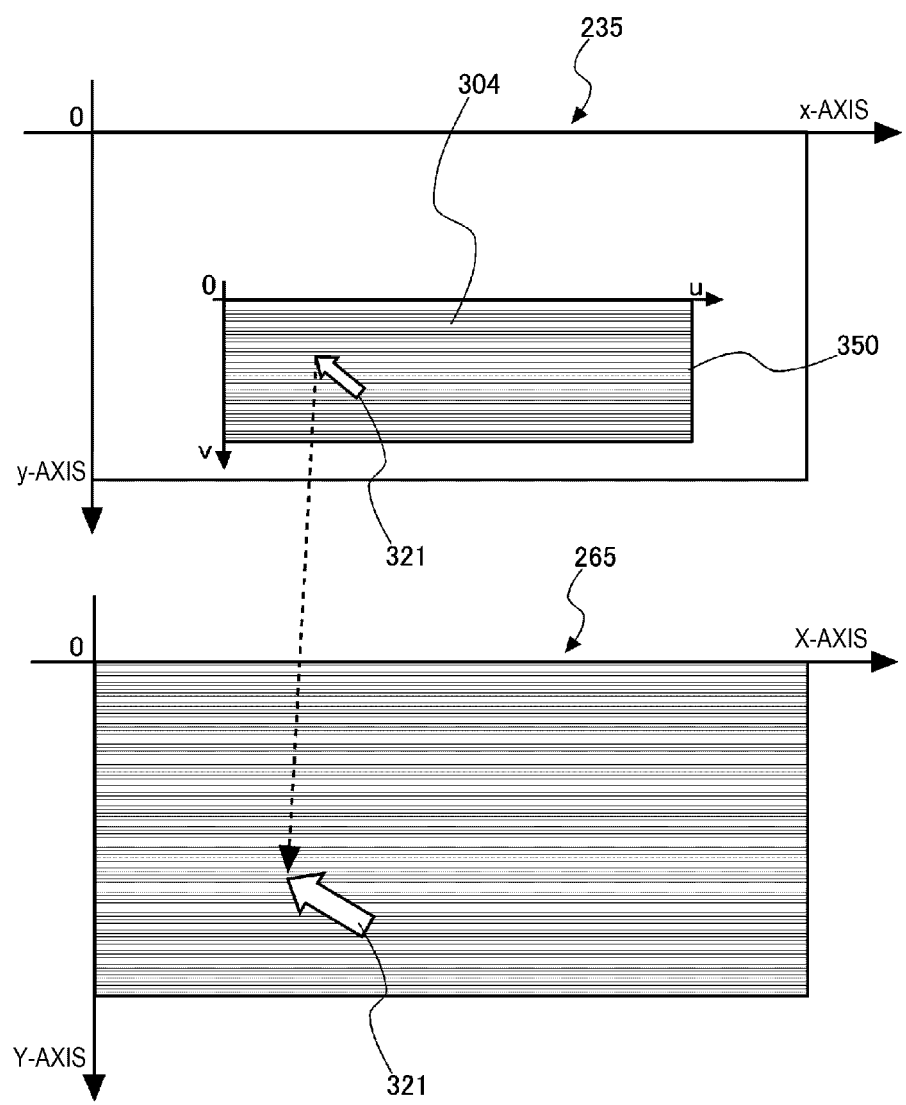
FIG. 5 shows an example of a coordinate system set on a display panel and a virtual display.

FIG. 5 shows an example of a coordinate system set on the display panel 235 and the virtual display 265.

The UI application 263B generates calibration data when securing the virtual display 265 in the storage area of the IP storage 260. The calibration data is data establishing a correspondence between the coordinates of the display panel 235 and the coordinates of the window 350 and data establishing a correspondence between the coordinates of the window 350 and the coordinates of the virtual display 265. Using these data enables conversion between the coordinates of the display panel 235, the coordinates of the window 350, and the coordinates of the virtual display 265.

FIG. 5 shows a coordinate system set on the display panel 235, a coordinate system set on the window 350, and a coordinate system set on the virtual display 265. The coordinate system set on the display panel 235 is a coordinate system having the origin at the top left of the display panel 235 and having a horizontal x-axis and a vertical y-axis. The coordinate system set on the window 350 is a coordinate system having the origin at the top left of the window 350 and having a horizontal u-axis and a vertical v-axis. The coordinate system set on the virtual display 265 is a coordinate system having the origin at the top left of the virtual display 265 and having a horizontal X-axis and a vertical Y-axis. In the calibration data, the origins of the coordinate system of the window 350 and the coordinate system of the virtual display 265 coincide with each other, the u-axis and the X-axis overlap each other, and the v-axis and the Y-axis overlap each other.

The window 350 can be displayed at any position on the display panel 235. Therefore, when the position of the window 350 is changed, the UI application 263B acquires the coordinates of the window 350 on the display panel 235 from the OS 261. The UI application 263B updates the data establishing the correspondence between the coordinates of the display panel 235 and the coordinates of the window 350, using the acquired coordinates of the window 350. Thus, even when the position of the window 350 is changed, the image drawn on the virtual display 265 can be displayed at the position of the window 350 on the display panel 235.

When the display of the image on the display panel 235 and the projection surface 5 is started, the UI application 263B acquires coordinate information representing the display position of the window 350 and the mouse pointer 321 on the display panel 235 from the OS 261.

The UI application 263B determines whether at least a part of the mouse pointer 321 is displayed in the window 350 or not, based on the acquired coordinate information. When at least a part of the mouse pointer 321 is displayed in the window 350, the UI application 263B converts the coordinate information of the mouse pointer 321 acquired from the OS 261 into the coordinate information on the virtual display 265, based on the calibration data. The UI application 263B draws an image of the mouse pointer 321 at a position on the virtual display 265 corresponding to the converted coordinate information.

A-6. Operation of UI Application 263B when Icon 370 is Dropped

Figure 6:
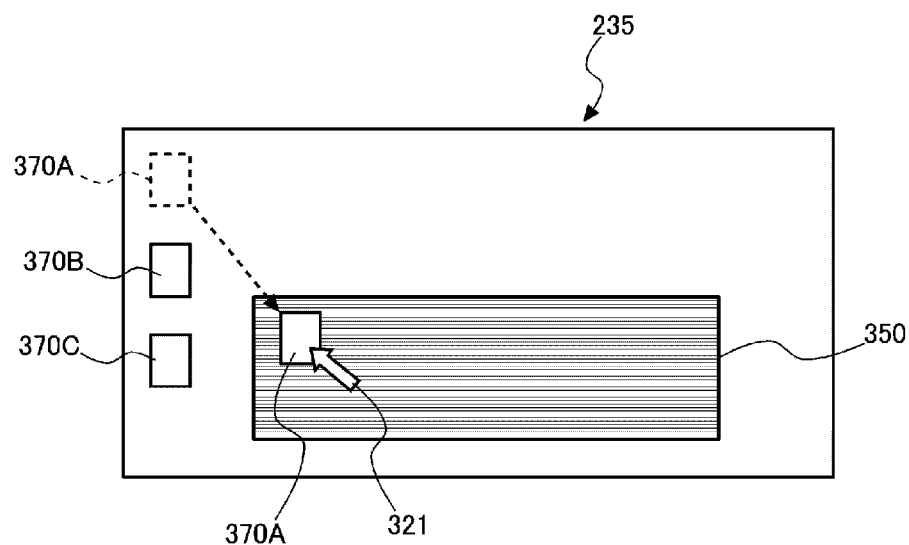
FIG. 6 shows an example of a display on the display panel.
Figure 7:
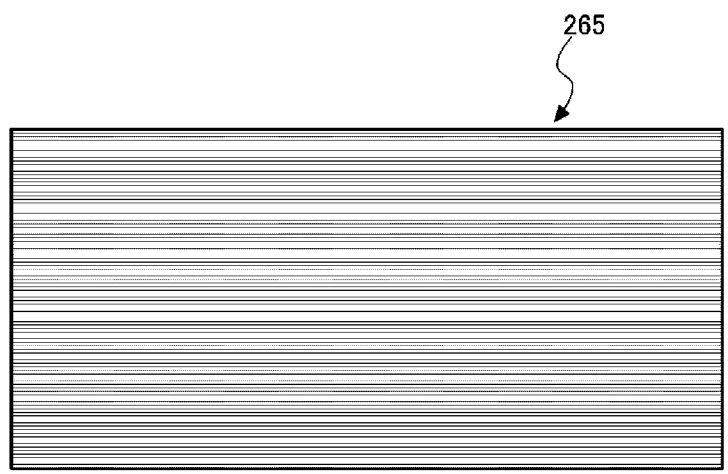
FIG. 7 shows an example of a display on the virtual display.
Figure 8:
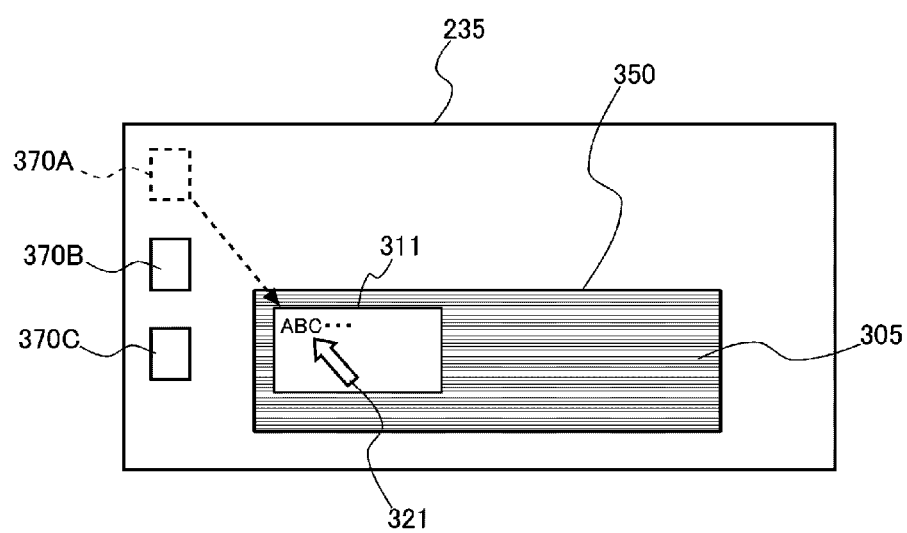
FIG. 8 shows an example of the display on the display panel.
Figure 9:
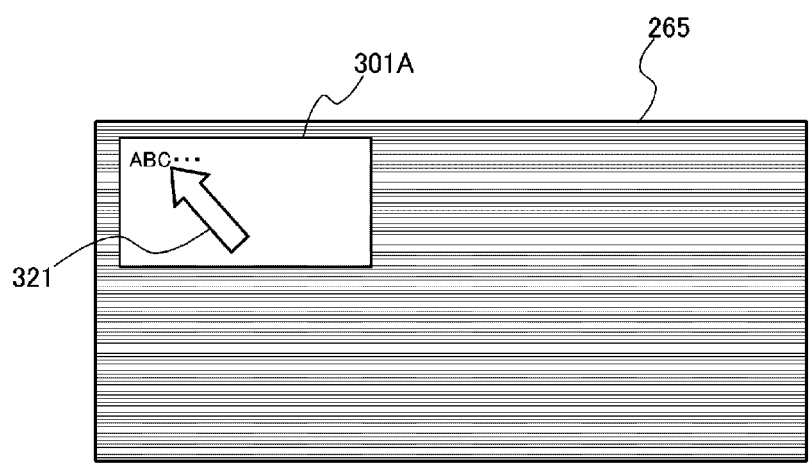
FIG. 9 shows an example of the display on the virtual display.

FIG. 6 shows an example of the display on the display panel 235. FIG. 7 shows an example of the display on the virtual display 265. FIG. 8 shows an example of the display on the display panel 235. FIG. 9 shows an example of the display on the virtual display 265.

Icons 370A, 370B, and 370C are displayed on the display panel 235. In the description below, the icons 370A, 370B, and 370C may be generically referred to as the "icon 370".

The UI application 263B acquires coordinate information representing the display position on the display panel 235 of each of the icons 370A, 370B, and 370C displayed on the display panel 235, from the OS 261.

The UI application 263B also acquires operation information representing an operation such as a right click, a left click, or a drag-and-drop operation on the mouse, and coordinate information representing the display position of the mouse pointer 321 displayed on the display panel 235, from the OS 261. While an example where the operator 220 is a mouse is described below, the input device is not limited to a mouse.

The UI application 263B determines whether there is any icon 370 whose display position is moved into the window 350 or not, based on the operation information of the mouse, the coordinate information of the mouse pointer 321, and the coordinate information of the window 350 acquired from the OS 261. FIG. 6 shows a state where the icon 370A is moved into the window 350 from outside by a drag operation. FIG. 6 shows a state before the icon 370A is dropped. At this point, as shown in FIG. 7, an image corresponding to the icon 370A is not drawn on the virtual display 265. When a drop operation on the icon 370A is performed in the window 350, the UI application 263B determines that the icon 370A is moved into the window 350. In the description below, it is assumed that the application corresponding to the icon 370A is the document application 263A. It is also assumed that, before the drop operation, the document application 263A is not started.

When determining that the icon 370A is moved into the window 350, the UI application 263B outputs a signal giving an instruction to start the document application 263A corresponding to the icon 370A, to the OS 261. When the OS 261 starts the document application 263A, the UI application 263B acquires the application image 301A of the document application 263A. The UI application 263B combines the acquired application image 301A and the background image 302 together and thus generates the projection image 303. The UI application 263B generates the reduced image 304A of the projection image 303 and outputs the generated reduced image 304A to the OS 261. Thus, as shown in FIG. 8, the small application image 311 is displayed in the window 350 on the display panel 235. Also, as shown in FIG. 9, the UI application 263B draws the generated projection image 303 on the virtual display 265 and generates the capture image 306 of the drawn image. The UI application 263B splits the capture image 306, based on the split data, and thus generates the first split image 331, the second split image 332, and the third split image 333. The UI application 263B transmits the first split image 331, the second split image 332, and the third split image 333, thus generated, to the corresponding projectors 100. Thus, the application image 301A is displayed on the projection surface 5.

In the above example, the document application 263A is started in response to the drop operation. However, the method for the UI application 263B to start the document application 263 is not limited to this example. For example, the UI application 263B may display a list of icons 370 and start an application 263 corresponding to an icon 370 selected by the user. Specifically, the UI application 263B acquires images of icons 370 of available applications 263 from the OS 261. The UI application 263B displays a list of the acquired images of the icons 370 in the window 350 and accepts a selection operation by the user. The UI application 263B then outputs a signal giving an instruction to start the application 263 corresponding to the selected icon 370, to the OS 261.

The method for the UI application 263B to display the application image 301A is not limited to the above example. For example, the UI application 263B may display a list of application images 301 in a reduced size, of applications 263 in operation, and start an application 263 according to a selection by the user. Specifically, the UI application 263B acquires the application images 301 of the applications 263 in operation from the OS 261. The UI application 263B displays a list of small application images formed by reducing the acquired application images 301, in the window 350, and accepts a selection operation by the user. The UI application 263B then executes a display for the application 263 corresponding to the selected small application image, according to the procedures described with reference to FIG. 3 and using the window 350 and the projector 100.

A-7. Flow of Operation of Information Processing Device

Figure 10:
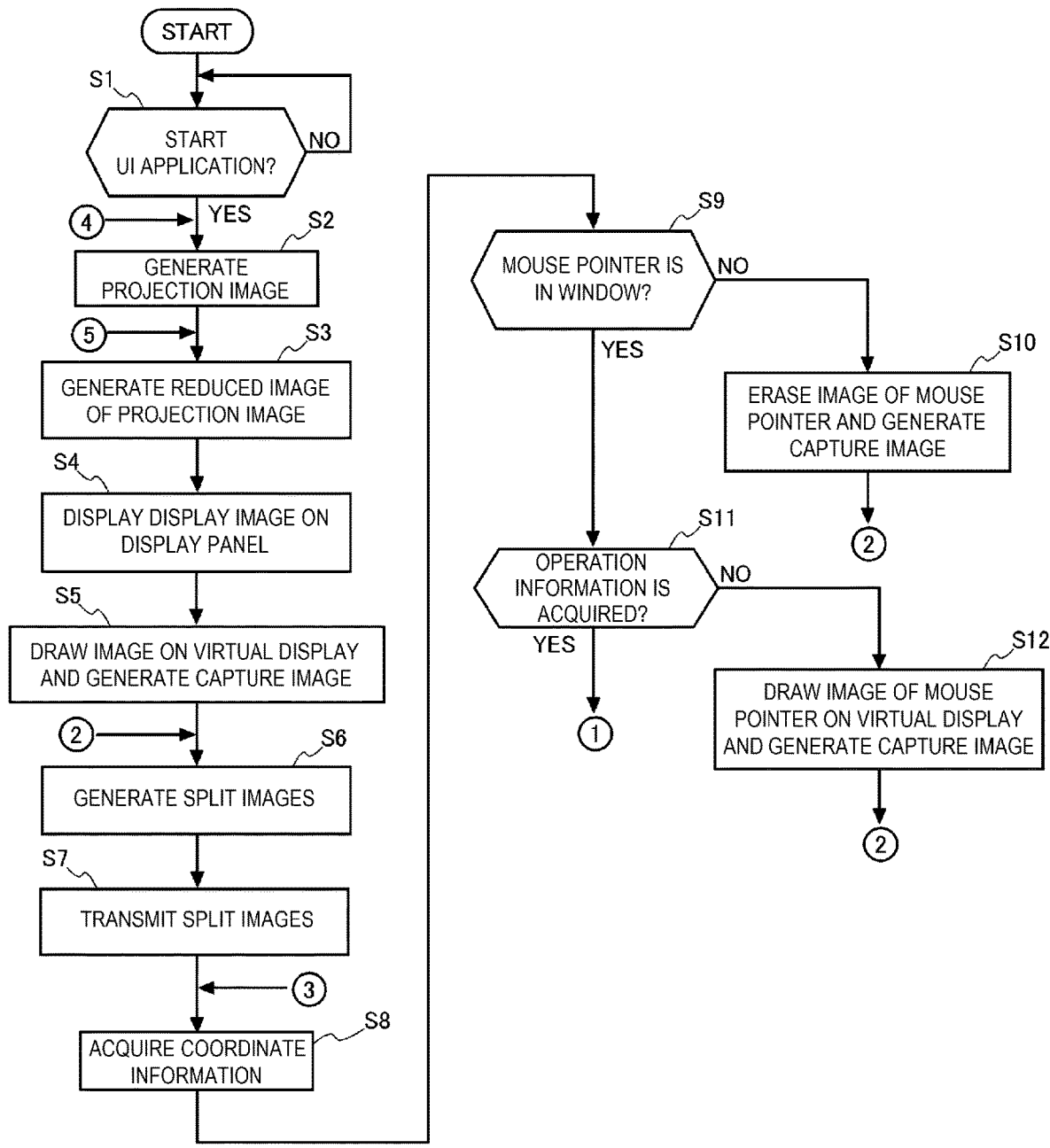
FIG. 10 is a flowchart showing an operation by the information processing device.

FIG. 10 is a flowchart showing an operation of the information processing device 200.

The operation of the IP controller 250 executing the UI application 263B will now be described with reference to the flowchart of FIG. 10.

First, the IP controller 250 determines whether the IP controller 250 has accepted an operation of starting the UI application 263B or not (step S1). When the IP controller 250 has not accepted an operation of starting the UI application 263B (NO in step S1), the IP controller 250 waits until accepting an operation of stating the UI application 263B.

When the IP controller 250 has accepted an operation of starting the UI application 263B (YES in step S1), the IP controller 250 executes the UI application 263B and generates the projection image 303 (step S2). When other applications such as the document application 263A are not started, the IP controller 250 generates the projection image 303 where only the background image 302 is displayed.

Next, the IP controller 250 generates the reduced image 304A of the projection image 303 (step S3) and causes the display panel 235 to display the display image 305 including the generated reduced image 304A (step S4). On the display panel 235, the mouse pointer 321, the task bar 323, the icon 370 and the like are displayed in addition to the reduced image 304A. The IP controller 250 acquires the coordinate information representing the display position of the window 350 displayed on the display panel 235.

Next, the IP controller 250 draws the projection image 303 generated in step S2 on the virtual display 265, captures the virtual display 265, and thus generates the capture image 306 (step S5). Next, the IP controller 250 splits the generated capture image 306, based on the split data, and thus generates the first split image 331, the second split image 332, and the third split image 333 (step S6). The IP controller 250 transmits the first split image 331, the second split image 332, and the third split image 333, thus generated, to the corresponding projectors 100A, 100B, and 100C (step S7).

Next, the IP controller 250 acquires the coordinate information representing the display position of the mouse pointer 321 from the OS 261 (step S8). The IP controller 250 determines whether the mouse pointer 321 is in the window 350 or not, based on the coordinate information of the window 350 and the acquired coordinate information of the mouse pointer 321 (step S9).

When determining that the mouse pointer 321 is not in the window 350 (NO in step S9), the IP controller 250 erases the image of the mouse pointer 321 drawn on the virtual display 265. Subsequently, the IP controller 250 captures the virtual display 265 and thus generates the capture image 306 (step S10). The IP controller 250 then returns to the processing of step S6.

When determining that the mouse pointer 321 is in the window 350 (YES in step S9), the IP controller 250 determines whether the IP controller 250 has acquired the operation information of the mouse from the OS 261 or not (step S11). The operation information includes a click operation or the like on the mouse.

When the IP controller 250 has not acquired the operation information of the mouse (NO in step S11), the IP controller 250 draws an image of the mouse pointer 321 on the virtual display 265 and generates the capture image 306 (step S12). The IP controller 250 then returns to the processing of step S6. When the IP controller 250 has acquired the operation information of the mouse (YES in step S11), the IP controller 250 shifts to the operation shown in the flowchart of FIG. 11.

The operation performed when it is determined in step S11 that the operation information is acquired will now be described with reference to the flowchart of FIG. 11.

The IP controller 250 determines the operation of the mouse, based on the operation information acquired in step S11. First, when the operation is an operation of moving the icon 370 into the window 350 (YES in step S13), the IP controller 250 acquires the application image 301 generated by the application 263 corresponding to the moved icon 370 (step S14). After acquiring the application image 301, the IP controller 250 shifts to step S2 and combines the acquired application image 301 and the background image 302 together to generate the projection image 303 (step S2). The IP controller 250 then repeats the processing from step S3 onward.

When determining in step S13 that the operation is not the operation of moving the icon 370 into the window 350 (NO in step S13), the IP controller 250 determines whether the operation information acquired in step S11 refers to an operation to the application 263 or not (step S15). When determining that the operation information refers to an operation to the application 263 (YES in step S15), the IP controller 250 determines whether the operation to the application 263 is an end operation of ending the application 263 or not (step S16).

When the operation is the end operation of ending the application 263 (YES in step S16), the IP controller 250 erases the application image 301 from the projection image 303 (step S17). The IP controller 250 generates the projection image 303 where only the background image 302 is displayed, and repeats the processing from step S3 onward.

When determining that the operation is not the end operation (NO in step S16), the IP controller 250 determines that the operation is an operation of designating processing to be executed by the application 263, and acquires the application image 301 reflecting the result of the processing corresponding to the operation, from the application 263 (step S18). Subsequently, the IP controller 250 combines the acquired application image 301 and the background image 302 together to generate the projection image 303 (step S2) and repeats the processing from step S3 onward.

Meanwhile, when determining in step S15 that the operation information does not refer to an operation to the application 263 (NO in step S15), the IP controller 250 determines whether the operation information accepted in step S11 refers to an operation of ending the UI application 263B or not (step S19). When determining that the accepted operation information does not refer to the operation of ending the UI application 263B (NO in step S19), the IP controller 250 returns to step S8 and waits until acquiring the coordinate information. Meanwhile, when determining that the accepted operation information refers to the operation of ending the UI application 263B (YES in step S19), the IP controller 250 ends the UI application 263B and ends this processing flow. Specifically, the UI application 263B erases the display of the window 350, stops transmitting the projection image 303 to the projector 100, releases the area of the virtual display secured in the IP storage 260, and stops operating. At this point, the application 263 does not end and continues operating.

A-8. Overview of First Embodiment

As described above, the information processing device 200 according to the first embodiment displays the small application image 311 formed by reducing the application image 301A generated by the document application 263A, on the display panel 235 provided in the information processing device 200.

When accepting an operation on the small application image 311, the information processing device 200 draws, on the virtual display 265, the application image 301B generated by the document application 263A executing the processing corresponding to the operation on the small application image 311.

The information processing device 200 causes the projector 100 to display the small application image 311 drawn on the virtual display 265. The information processing device 200 also causes the display panel 235 to display the small application image 313 formed by reducing the application image 301B.

Therefore, when the reduced image 304A displayed on the display panel 235 is operated, the processing corresponding to the operation is executed by the application 263. As the application image 301B generated by the processing is drawn on the virtual display 265, the application image 301B can be displayed on the projection surface 5. Also, the small application image 313 formed by reducing the application image 301B is displayed on the display panel 235. Therefore, processing corresponding to an operation on the small application image 311 can be executed by the application 263 and the application image 301B generated by the processing can be projected using the projector 100. Thus, the convenience of the user can be improved.

Also, the application image 301A, which is the image before the small application image 311 is reduced, is displayed on the projection surface 5 by the projector 100.

Therefore, the user can operate the small application image 311 displayed on the display panel 235 while viewing the application image 301A displayed on the projection surface 5. Thus, improved convenience is achieved.

B. Second Embodiment

B-1. Changes from First Embodiment

The same components as in the first embodiment are denoted by the same reference signs and are not described further in detail.

In the first embodiment, the projection image 303 is drawn on the virtual display 265 under the control of the UI application 263B.

In a second embodiment, the application image 301 generated by the application 263 is drawn on the virtual display 265 under the control of the OS 261. The OS 261 secures a storage area used as the virtual display 265, in the IP storage 260. The OS 261 operates in an extended mode and recognizes the virtual display 265 secured in the IP storage 260 as an extended display continuing to the display panel 235.

Figure 12:
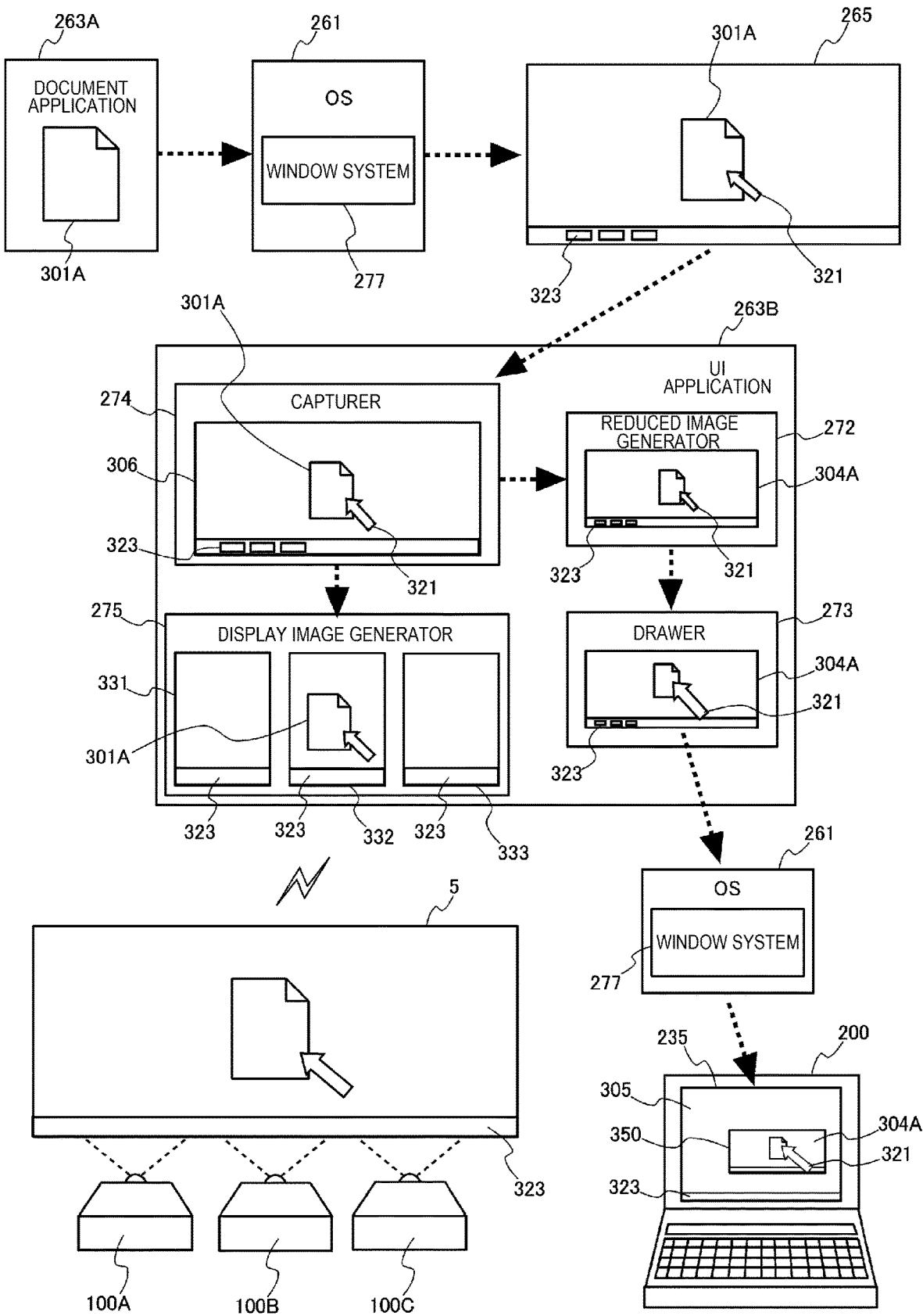
FIG. 12 shows a flow of processing by an IP controller in a second embodiment.

FIG. 12 shows a flow of processing by the IP controller 250 in the second embodiment.

The operation of the IP controller 250 executing the UI application 263B will now be described with reference to FIG. 12.

The IP controller 250 executing the document application 263A generates the application image 301A. The generated application image 301A is drawn on the virtual display 265 by the window system 277 of the OS 261. At this point, the window system 277 also draws images of the mouse pointer 321 and the task bar 323 on the virtual display 265.

In the UI application 263B, the capturer 274 captures the images drawn on the virtual display 265 and generates the capture image 306. The capturer 274 outputs the generated capture image 306 to the reduced image generator 272 and the display image generator 275.

The reduced image generator 272 reduces the inputted capture image 306 and thus generates the reduced image 304A. The reduced image generator 272 outputs the generated reduced image 304A to the OS 261. The window system 277 combines together the inputted reduced image 304A and the images of the mouse pointer 321, the task bar 323, and the icon 370 or the like and thus generates the display image 305. The OS 261 causes the display panel 235 to display the generated display image 305. The reduced image 304A and the display image 305 include the small application image 311. The reduced image 304A or the display image 305 is equivalent to an image showing the virtual display 265.

The display image generator 275 splits the inputted capture image 306 into a plurality of images, based on the split data. The display image generator 275 splits the capture image 306 into the first split image 331, the second split image 332, and the third split image 333, based on the split data. The display image generator 275 outputs the first split image 331, the second split image 332, and the third split image 333, thus split, to the communication controller 276.

The communication controller 276 controls the IP wireless communicator 210 to transmit the first split image 331 to the projector 100A, transmit the second split image 332 to the projector 100B, and transmit the third split image 333 to the projector 100C.

The projector 100A, when receiving the first split image 331 from the information processing device 200, performs image processing on the received first split image 331 and projects image light based on the processed first split image 331 into the projection area 10A.

Similarly, the projectors 100B and 100C, when receiving the second split image 332 and the third split image 333 respectively from the information processing device 200, process the received second split image 332 and third split image 333 respectively. The projectors 100B and 100C project image light based on the processed second split image 332 and third split image 333 into the projection areas 10B and 10C. Thus, the application image 301A drawn on the virtual display 265 by the drawer 273 is displayed on the projection surface 5.

The virtual display 265 is recognized as an extended display by the OS 261. That is, the virtual display 265 is an extended display for extending the display area of the display panel 235. Therefore, the user can move the mouse pointer 321 to the virtual display 265 by operating the mouse. When the mouse is moved to the virtual display 265, the OS 261 draws an image of the mouse pointer 321 on the virtual display 265. Therefore, in the capture image 306 formed by capturing the virtual display 265, the image of the mouse pointer 321 displayed by the OS 261 is displayed. Thus, the image of the mouse pointer 321 is displayed in the image displayed on the projection surface 5 by the projector 100.

Meanwhile, the reduced image 304A displayed in a window on the display panel 235 is an image generated by causing the capturer 274 to capture the image drawn on the virtual display 265 to generate the capture image 306 and then reducing the generated capture image 306, as described with reference to FIG. 10. An image formed by superimposing the reduced image 304A along with the images of the mouse pointer 321, the task bar 323, and the icon 370 or the like on the display image 305, is displayed in a window as the reduced image 304A on the display panel 235.

The image of the mouse pointer 321 is an image drawn along with the task bar 323 or the like on the virtual display 265 when the window system 277 of the OS 261 draws the application image 301A generated by the document application 263A, on the virtual display 265. That is, the image of the mouse pointer 321 is included in the capture image 306 generated by the capturer 274 capturing the image, and is reduced by the reduced image generator 272. Therefore, the mouse pointer 321, too, is reduced in size, causing a drop in operability when the user operates the mouse while viewing the reduced image 304A.

To cope with this, the UI application 263B, when taking in operation information inputted from the operator 220, acquires the coordinate information of the mouse pointer 321 as of when the operation by the operator 220 is performed, from the OS 261. The UI application 263B determines whether the acquired coordinate information of the mouse pointer 321 is moved to the virtual display 265 or not.

The UI application 263B may also analyze the capture image 306 of the virtual display 265, determine whether the capture image 306 includes the image of the mouse pointer 321 or not, and thus determine whether the display position of the mouse pointer 321 is moved to the virtual display 265 or not.

When the display position of the mouse pointer 321 is moved to the virtual display 265, the UI application 263B superimposes an image of the mouse pointer 321 in a preset size at the coordinates in the reduced image 304A corresponding to the coordinate information of the mouse pointer 321 acquired from the OS 261. At the coordinate in the reduced image 304A where an image of the mouse pointer 321 is superimposed by the UI application 263B, the image of the mouse pointer 321 drawn by the OS 261 is displayed. However, the image of the mouse pointer 321 is reduced in size by the reduction by the reduced image generator 272. The size of the image of the mouse pointer 321 superimposed on the reduced image 304A by the UI application 263B is the same size as when the mouse pointer 321 is displayed in the area outside the window 350 on the display panel 235.

Since the virtual display 265 is an extended display, the icon 370 and the application image 301A generated by the application 263 corresponding to the icon 370 are displayed on the virtual display 265 by a user's operation. The UI application 263B displays the capture image 306, using the projector 100, and therefore can accept a user's operation on the application image 301A displayed using the projector 100, as a user's operation on the virtual display 265.

When accepting an operation on the application image 301A displayed on the virtual display 265, the OS 261 causes the application 263 to execute processing corresponding to the accepted operation and draws the application image 301B generated by the processing of the application 263, on the virtual display 265. The application image 301B generated by the application 263 executing the processing corresponding to the application image 301A displayed on the virtual display 265 is equivalent to a third image.

The UI application 263B captures the virtual display 265 to generate the capture image 306 and generates the reduced image 304B of the generated capture image 306 according to the procedures described with reference to FIG. 12. The reduced image 304B is equivalent to a third reduced image. The reduced image 304B includes the small application image 313 formed by reducing the application image 301B. The small application image 313 is equivalent to a third small image.

When the reduced image 304B includes an image of the mouse pointer 321, the UI application 263B superimposes an image of the mouse pointer 321 in a preset size on the mouse pointer 321 displayed in the reduced image 304B. The UI application 263B then outputs the reduced image 304B with the image of the mouse pointer 321 superimposed thereon, to the OS 261. Thus, the reduced image 304B reflecting the result of the processing corresponding to the operation on the application image 301A displayed on the virtual display 265 is displayed on the display panel 235.

The UI application 263B also splits the generated capture image 306 and thus generates the first split image 331, the second split image 332, and the third split image 333. The UI application 263B transmits the first split image 331, the second split image 332, and the third split image 333, thus generated, to the projectors 100A, 100B, and 100C and causes the projectors 100A, 100B, and 100C to display the capture image 306 including the updated application image 301B on the projection surface 5. Thus, the application image 301B is displayed using the projector 100.

B-2. Operation of Information Processing Device According to Second Embodiment

Figure 13:
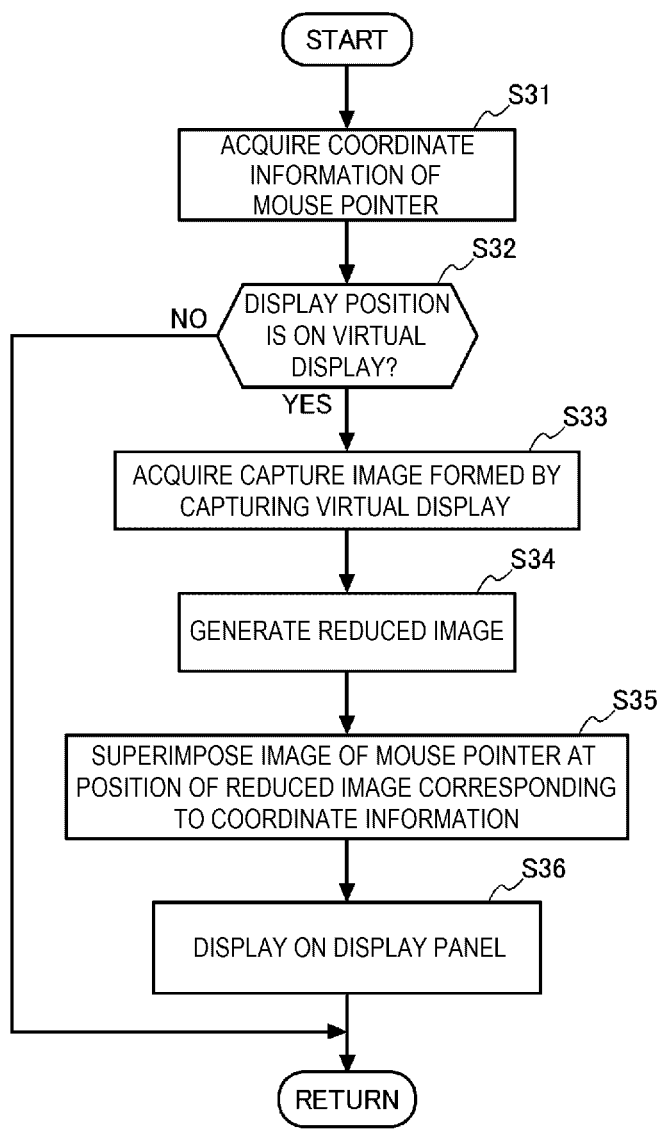
FIG. 13 is a flowchart showing a processing flow for enlarging the display size of a mouse pointer displayed on the display panel.

FIG. 13 is a flowchart showing a processing flow for enlarging the display size of the mouse pointer 321 displayed on the display panel 235.

First, the IP controller 250 executing the UI application 263B acquires the coordinate information of the mouse pointer 321 (step S31). Based on the acquired coordinate information, the IP controller 250 determines whether the display position of the mouse pointer 321 is on the virtual display 265 or not (step S32). When the display position of the mouse pointer 321 is not on the virtual display 265 (NO in step S32), the IP controller 250 returns to step S31 (RETURN).

When the display position of the mouse pointer 321 is on the virtual display 265 (YES in step S32), the IP controller 250 acquires the capture image 306 formed by capturing the virtual display 265 (step S33) and generates the reduced image 304A of the acquired capture image 306 (step S34). Next, the IP controller 250 converts the coordinate information acquired in step S31 to the coordinates of the reduced image 304A and superimposes an image of the mouse pointer 321 at the position of the reduced image 304A represented by the converted coordinate information (step S35).

Next, the IP controller 250 causes the display panel 235 to display the display image 305 including the reduced image 304A with the image of the mouse pointer 321 superimposed thereon and also including the task bar 323 and the icon 370 or the like, under the control of the OS 261 (step S36) and returns to step S31 (RETURN). This processing flow ends, for example, in response to the acceptance of an operation of ending the UI application 263B.

B-3. Overview of Second Embodiment

The virtual display 265 is an extended display of the display panel 235, which is an actual display.

The information processing device 200 according to the second embodiment draws the application image 301A on the virtual display 265 and causes the projector 100 to display the application image 301A drawn on the virtual display 265.

The information processing device 200 accepts an operation on the application image 301A displayed by the projector 100 and draws, on the virtual display 265, the application image 301B generated by the application program executing the processing corresponding to the operation on the application image 301A.

The information processing device 200 causes the projector 100 to display the application image 301B drawn on the virtual display 265 and displays the small application image 313 formed by reducing the application image 301B, on the display panel 235.

That is, the image drawn on the virtual display 265, which is an extension display of the display panel 235, is displayed on the projection surface 5 by the projector 100. Therefore, an operation performed by the user on the application image 301A displayed on the projection surface 5 can be accepted as an operation on the application image 301A drawn on the virtual display 265.

Also, the application image 301B corresponding to the accepted operation is displayed on the projection surface 5 by the projector 100 and the small application image 313 formed by reducing the application image 301B is displayed on the display panel 235. Therefore, the application 263 can execute the processing corresponding to the operation on the application image 301 displayed on the projection surface 5 in addition to the operation on the small application image 313 described in the first embodiment. The user can check the result of processing by the application 263 corresponding to the inputted operation, on the projection surface 5 and the display panel 235. Thus, the convenience of the user can be improved.

The information processing device 200 displays the reduced image 304A or the display image 305 as an image showing the virtual display 265 including the small application image 311, on the display panel 235, and draws the image of the mouse pointer 321 on the virtual display 265.

The information processing device 200 displays, on the display panel 235, an image of the mouse pointer 321 superimposed on the image showing the virtual display 265 and in the size of the image of the mouse pointer 321 displayed in the area outside the image showing the virtual display 265 on the display panel 235.

Therefore, when displaying the image of the mouse pointer 321 in the reduced image 304A displayed on the display panel 235, the image of the mouse pointer 321 can be restrained from being displayed in a small size in the reduced image 304A. Therefore, the operability of an operation by the mouse pointer 321 can be improved.

The foregoing embodiments are preferred embodiments of the present disclosure. However, the present disclosure is not limited to the foregoing embodiments and can be implemented with various modifications without departing from the spirit and scope of the present disclosure.

For example, each functional unit of the information processing device 200 shown in FIG. 2 represents a functional configuration and is not particularly limited to any specific form of installation. That is, individual pieces of hardware corresponding to individual functional units need not necessarily be installed. A single processor can execute a program to implement functions of a plurality of functional units. In the foregoing embodiments, a part of the functions implemented by software may be implemented by hardware and a part of the functions implemented by hardware may be implemented by software. Also, any change can be made to specific details of the configuration of each of the other parts of the projector 100 without departing from the spirit and scope of the present disclosure.

Figure 11:
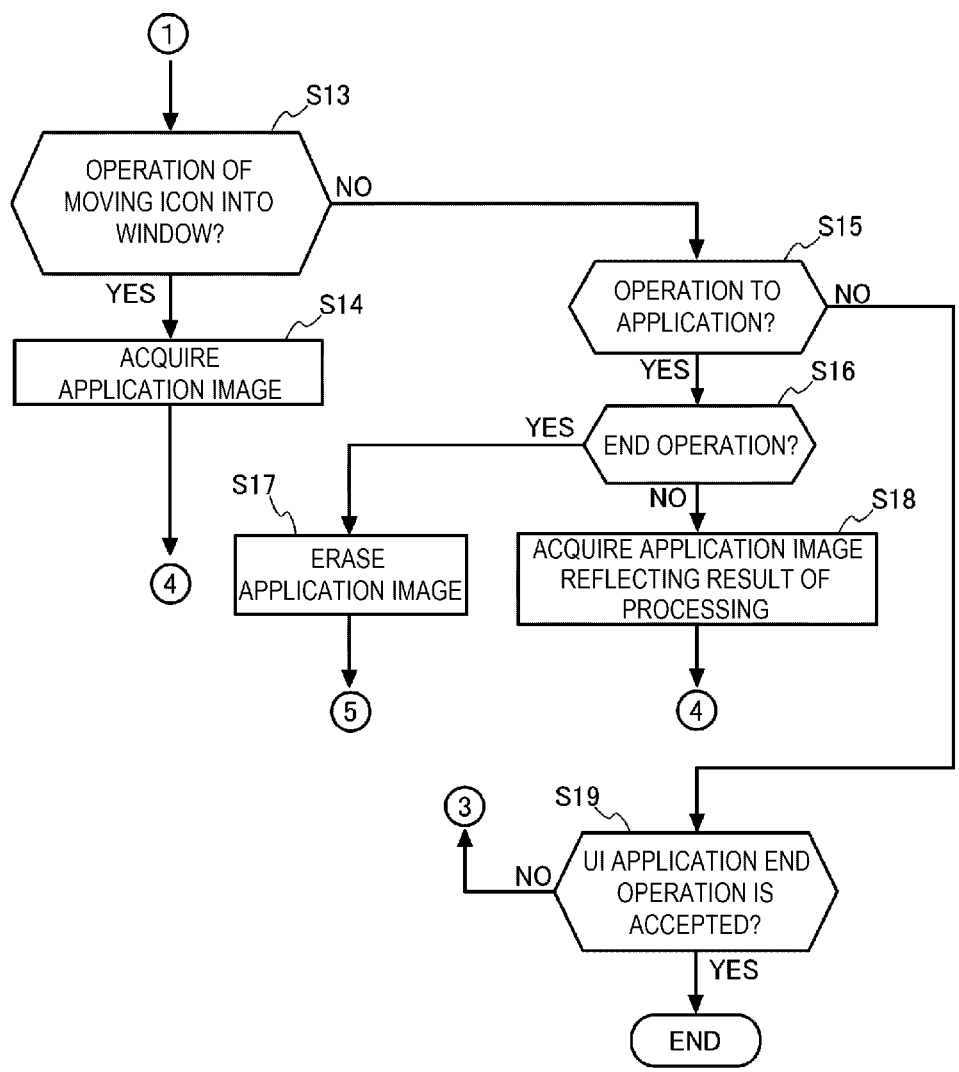
FIG. 11 is a flowchart showing an operation by the information processing device when operation information is acquired.

The processing steps in the flowcharts shown in FIGS. 10 and 11 or 13 are provided by splitting the processing according to the main processing content in order to facilitate understanding of the processing by the information processing device 200. The present disclosure is not limited by the way the processing is split into processing steps and the names thereof shown in the flowcharts of FIGS. 10 and 11 or 13. Depending on the processing content, the processing by the IP controller 250 may be split into further processing steps. Also, one processing step may be split to include further processing. The order of the processing in the flowcharts is not limited to the illustrated examples.

The program to be executed by the information processing device 200 can be configured in the form of a recording medium or a transmission medium transmitting the program. The information processing device 200 reads the program recorded in the recording medium and stores the read program in the IP storage 260. Also, the information processing device 200 is coupled to a server device, not illustrated, downloads a program from the server device, and stores the downloaded program in the IP storage 260. The IP controller 250 executes the program stored in the IP storage 260 and thus controls each part of the information processing device 200 according to the procedures in the flowcharts shown in FIGS. 10 and 11 or 13.

What is claimed is:

1. A display control method comprising:
displaying a first small image generated by shrinking a first image generated by an application program, on an actual display provided in an output device;
receiving an operation on the first small image;
drawing, on a virtual display, a second image generated by the application program executing processing corresponding to the operation on the first small image;
displaying the second image drawn on the virtual display, using a display device; and
displaying a second small image generated by shrinking the second image, on the actual display;
drawing the first image on the virtual display;
displaying the first image drawn on the virtual display, using the display device;
receiving an operation on the first image displayed using the display device;
drawing, on the virtual display, a third image generated by the application program executing processing corresponding to the operation on the first image;
displaying the third image drawn on the virtual display, using the display device;
displaying a third small image generated by shrinking the third image, on the actual display;
drawing an image of a pointer on the virtual display; and
displaying, on the actual display, an image of the pointer superimposed on the image showing the virtual display, wherein
the virtual display is an extended display of the actual display, and
the image of the pointer superimposed on the image showing the virtual display has a size of an image of a pointer displayed in an area outside the image showing the virtual display on the actual display.

2. The display control method according to claim 1, wherein
the displaying the first small image is displaying an image showing the virtual display including the first small image, on the actual display.

3. A non-transitory computer-readable storage medium storing a program, the program causing a computer to execute:
displaying a first small image generated by shrinking a first image generated by an application program, on an actual display provided in an output device;
receiving an operation on the first small image;
drawing, on a virtual display, a second image generated by the application program executing processing corresponding to the operation on the first small image;
displaying the second image drawn on the virtual display, using a display device; and
displaying a second small image generated by shrinking the second image, on the actual display;
drawing the first image on the virtual display;
displaying the first image drawn on the virtual display, using the display device;
receiving an operation on the first image displayed using the display device;
drawing, on the virtual display, a third image generated by the application program executing processing corresponding to the operation on the first image;
displaying the third image drawn on the virtual display, using the display device;
displaying a third small image generated by shrinking the third image, on the actual display;
drawing an image of a pointer on the virtual display; and
displaying, on the actual display, an image of the pointer superimposed on the image showing the virtual display, wherein
the virtual display is an extended display of the actual display, and
the image of the pointer superimposed on the image showing the virtual display has a size of an image of a pointer displayed in an area outside the image showing the virtual display on the actual display.

* * * * *